US009230296B2

(12) United States Patent
Clatanoff et al.

(10) Patent No.: US 9,230,296 B2
(45) Date of Patent: Jan. 5, 2016

(54) SPATIAL AND TEMPORAL PULSE WIDTH MODULATION METHOD FOR IMAGE DISPLAY

(71) Applicant: TEXAS INSTRUMENTS INCORPORATED, Dallas, TX (US)

(72) Inventors: Todd Alan Clatanoff, Allen, TX (US); Philip Scott King, Allen, TX (US); Jeffrey Mathew Kempf, Allen, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 67 days.

(21) Appl. No.: 13/781,300

(22) Filed: Feb. 28, 2013

(65) Prior Publication Data

US 2013/0222403 A1 Aug. 29, 2013

Related U.S. Application Data

(60) Provisional application No. 61/604,387, filed on Feb. 28, 2012.

(51) Int. Cl.
*G06T 1/60* (2006.01)
*G02B 26/08* (2006.01)

(52) U.S. Cl.
CPC .............. *G06T 1/60* (2013.01); *G02B 26/0833* (2013.01)

(58) Field of Classification Search
None
See application file for complete search history.

(56) References Cited

U.S. PATENT DOCUMENTS

| 5,278,652 | A | | 1/1994 | Urbanus et al. |
| 5,497,172 | A | | 3/1996 | Doherty et al. |
| 5,548,301 | A | * | 8/1996 | Kornher et al. ................ 345/85 |
| 6,115,083 | A | | 9/2000 | Doherty et al. |
| 6,201,521 | B1 | * | 3/2001 | Doherty .......................... 345/84 |
| 2010/0053477 | A1 | * | 3/2010 | Hui et al. ...................... 348/755 |
| 2012/0218323 | A1 | | 8/2012 | Morgan |
| 2013/0100177 | A1 | | 4/2013 | Clatanoff et al. |

* cited by examiner

Primary Examiner — Stephen R Koziol
Assistant Examiner — Diana Hickey
(74) Attorney, Agent, or Firm — Jacqueline J. Garner; Frank D. Cimino

(57) ABSTRACT

A method of controlling micromirrors of reset groups of a spatial light modulator (SLM) digital micromirror array is disclosed. In a first reset operation, the positions of a first subgroup of micromirrors of a reset group are set based on a first portion of a first bitplane and the positions of a second subgroup of micromirrors of the same reset group are set based on a first portion of a second bitplane. Then, in a second reset operation, the positions of the first subgroup are set based on a second portion of the second bitplane and the positions of the second subgroup are set based on a second portion of a first bitplane. In one example, subsets of alternating rows of micromirrors of the same reset group are successively set according to alternating data corresponding to different ones of first and second bitplanes.

5 Claims, 7 Drawing Sheets

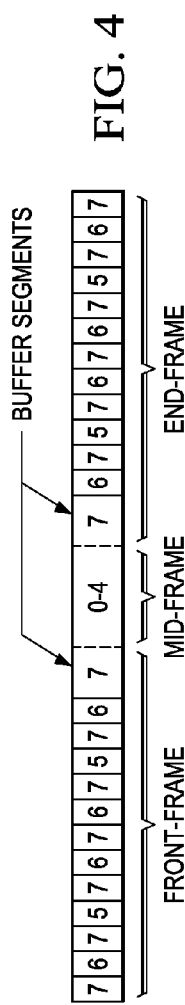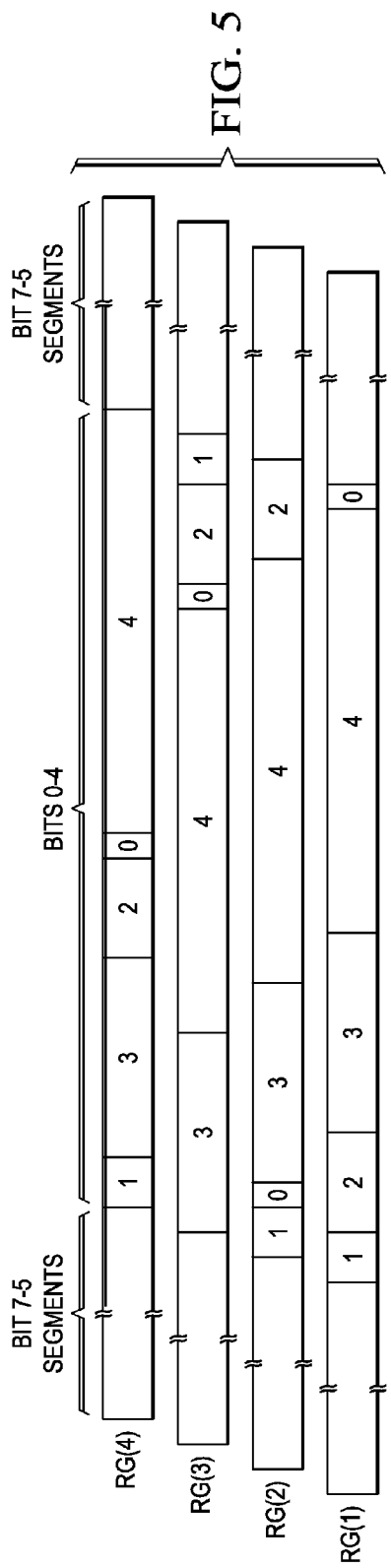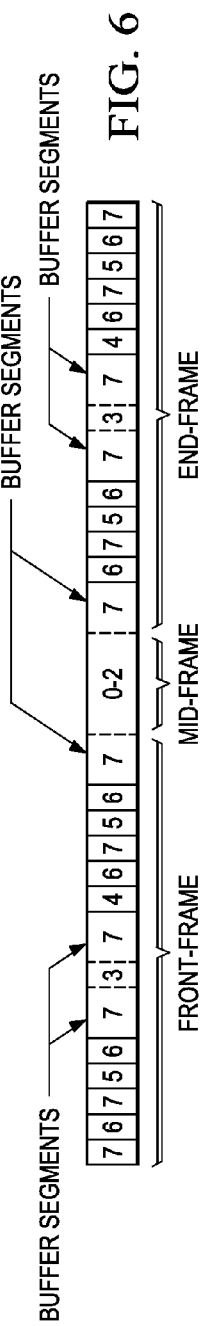

SPATIAL AND TEMPORAL PULSE WIDTH MODULATION METHOD FOR IMAGE DISPLAY

This application claims the benefit of Provisional Application No. 61/604,387, filed Feb. 28, 2012, the entirety of which is hereby incorporated by reference.

BACKGROUND

This relates to pulse width modulation methods for image display systems, especially suitable for application to loading spatial light modulators with image data.

Many modern image display systems utilize spatial light modulators (SLMs). SLMs comprise arrays of individually addressable and controllable pixel elements that modulate light according to input data streams corresponding to image frame pixel data.

Digital micromirror devices (DMDs) are a type of SLM, and may be used for either direct-view or projection display applications. A DMD has an array of micromechanical pixel elements, each having a tiny mirror that is individually addressable by an electronic signal. Depending on the state of its addressing signal, each mirror element tilts so that it either does or does not reflect light to the image plane. Other SLMs operate on similar principles, with arrays of pixel elements that may emit or reflect light simultaneously with other pixel elements, such that a complete image is generated by sequences of addressing the pixel elements. Another example of an SLM is a liquid crystal display (LCD) which has individually driven pixel elements. Typically, displaying each frame of pixel data is accomplished by loading memory cells so that pixel elements can be simultaneously addressed.

In a typical SLM display system, pulse-width modulation (PWM) techniques are used to achieve intermediate levels of illumination, between white (ON) and black (OFF), corresponding to gray levels of intensity. A basic PWM scheme involves first determining a rate at which images are to be presented to a viewer. This establishes a frame rate and a corresponding frame period. For example, in a standard television system, images may be transmitted at 30 frames per second, and each frame lasts for approximately 33.3 milliseconds. Then, an intensity resolution for each pixel element is established. For example, to achieve an intensity resolution of n bits per frame, the frame time may be divided into $2^{n-1}$ equal time slices. Thus, for a 33.3 millisecond frame period and n-bit intensity values, each time slice has a duration of $33.3/2^{n-1}$ milliseconds.

Once the desired resolution (number of intensity bits per pixel per frame) and time slice duration (milliseconds per time slice) are determined, pixel intensities are quantized for each pixel of each frame with a least significant bit (LSB) corresponding to one time slice. For example, black having minimum intensity with illumination for zero time slices may be represented with all bits=0, and white having maximum intensity with illumination for all time slices ($2^{n-1}$ time slices) may be represented with all bits=1. Each pixel's quantized intensity determines its on-time during a frame period. Thus, during a frame period, each pixel with a quantized value of more than 0 is ON for the number of time slices that correspond to its intensity. The viewer's eye integrates the pixel brightness so that the image appears the same as if it were generated with analog levels of light.

For addressing SLMs, PWM calls for the data to be formatted into "bit-planes," each bit-plane corresponding to a bit weight of the intensity value. Thus, if intensity is represented by an n-bit value, each frame of data has n bit-planes. Each bit-plane has a 0 or 1 value for each pixel element. In the basic PWM scheme described above, during a frame, each of the n bit-planes is separately loaded and the pixel elements addressed according to their respective associated bit-plane values. For instance, in a simple example, the bit-plane representing the LSBs of each pixel is displayed for 1 time slice, whereas the bit-plane representing the MSBs (most significant bits) may be displayed for 2n/2 time slices. Because a time slice is only 33.3/255 milliseconds long, the SLM must be capable of loading the LSB bit-plane within that time period. The time for loading the LSB bit-plane is the peak data rate.

A high peak data rate puts high throughput demands on the design of SLMs. To minimize the peak data rate, modifications to the above-described loading scheme have been devised. These loading schemes are acceptable only to the extent that they minimize visual artifacts in the displayed image.

One such modification uses an SLM whose pixel elements are grouped into reset groups that are separately loaded and addressed. This reduces the amount of data to be loaded during any one time, and permits the LSB data for each reset group to be displayed at a different time during the frame period. This configuration is described in U.S. Pat. No. 5,548,301, incorporated herein by reference.

Another method of PWM of frames of data used by a spatial light modulator having individually addressable pixel elements is described in U.S. Pat. No. 5,497,172, incorporated herein by reference. In that approach, the display period for each frame of data is divided into a number of time slices. Each frame of data is formatted into bit-planes, with each bit-plane having one bit of data for each pixel element and representing a bit-weight of the intensity value to be displayed by that pixel element. Each bit-plane has a display time corresponding to a number of time slices. The bit-planes are then sub-formatted into reset groups, each reset group having data for a group of pixel elements to be addressed at a different time from other pixel elements. The display times of reset groups from bit-planes of one or more of the more significant bit weights are segmented into two or more segments, which permits those display times to be distributed throughout the frame period. The loading of memory cells associated with the pixel elements is then performed in three phases. First, front-frame loading loads about half of the segments, such that, for all reset groups, segments having the same bit weight are loaded at substantially the same time. Then, mid-frame loading loads the reset groups of bit-planes of one or more of the less significant bits. Finally, end-frame loading loads the remaining segments, such that for all reset groups, segments having the same bit-weight are loaded at substantially the same time. This approach provides the advantage that it successfully implements data loading for split reset configurations. It provides good picture quality, both when the image is in motion and when it is still, by combining features of different data loading methods. The method does not require increased bandwidth or result in lower light efficiency, as compared to other split reset addressing methods.

An inherent problem with displays using Pulse Width Modulation (PWM) usually involves a tradeoff between brightness, color separation, PWM power consumption, and PWM temporal artifacts. Optimizing one of these parameters typically results in degradation in performance of the others.

It is well known that the power consumption attributed to the PWM sequence is linearly proportional to the number of bit splits in the sequence. For battery powered systems (e.g. handheld pico projectors), reducing the PWM power consumption can lead to longer "run" times between charges by decreasing the number of bit splits in the PWM sequences. This, however, introduces visible PWM artifacts using present day display methods.

Likewise, when the display time for a color is small relative to the system's load time, the likelihood of image quality artifacts is greatly increased. Such artifacts become easier to see with each successive generation of products as brightness improves.

Additionally, due to the processor-to-DMD bandwidth limitations of some systems, the amount of PWM bit splitting is limited by the hardware due to the excessive time it takes to load the DMD. For such systems (e.g. a pico projector embedded in a cell phone) a new technique must be found that addresses the poor PWM image quality resulting from reduced bit spitting.

All of the PWM temporal artifacts mentioned above are the result of large time separations between PWM bit planes. Decreasing the time separation between PWM bit planes of the same color leads to better PWM performance.

Additional background is disclosed in U.S. Pat. Nos. 6,115,083 and 6,201,521, the entireties of both of which are incorporated herein by reference.

SUMMARY

Present-day PWM is accomplished by loading each reset group with the same bit plane data. Each bit plane is then displayed at one or more time intervals throughout the video frame. Any time there is a large time separation between adjacent bit planes numbers within the same color, a PWM temporal artifact may result as those two bits transition to different states (e.g., binary bits 01 transitioning to 10).

According to the method disclosed herein, each reset group is loaded using more than one bit plane, which allows multiple bit planes to be displayed simultaneously but spatially multiplexed. Any resultant temporal artifacts can be "hidden" by loading/displaying the data via a high spatial frequency technique (e.g. load even lines with one bit plane, odd lines with another). Different 2-dimensional spatial loading schemes (e.g. non-structured two dimensional patterns) can be employed to help break up any possible high-frequency artifacts that may be visible during viewer eye movement or motion video.

For systems with low bandwidth between the processor and DMD, this technique of loading alternating even and odd lines can be used, however, the different bit planes loaded into the even/odd lines can occur sequentially, instead of concurrently, coupled with a DMD reset scheme that resets portions of the DMD *between* these successive loads. By splitting the loading of the DMD into even and odd transfers, the peak bandwidth to the DMD is reduced by a factor of 2.

Along with the required hardware changes, this invention proposes a sequence design method for implementing this concept that requires the same number of loads and resets (per reset group) vs. the present-day technique. This method allows the loading of bit planes to be spatially multiplexed, with no changes to the present-day HW for resetting the DMD.

The time separation between two different bit planes is reduced to zero which yields the best theoretical PWM performance.

The low-bandwidth technique enables PWM sequencing on systems that could not otherwise be used due to their low processor-to-DMD bandwidth.

The disclosed method can be used for the following:
Decrease PWM power consumption while maintaining Image Quality
Increase PWM image quality
Reduce flicker (for LSBs or slow frame rates)
Enable larger DMD load times
Enable high frame rate displays while maintaining Image Quality
Enable 3D PWM sequence display on pico-based systems
Improve mid-intensity color separation performance This method is used to display two different bit planes of the same color at the same time across a small spatial area (e.g. SLM reset group).

Additionally, the low-bandwidth technique essentially allows for two different PWM sequences to be simultaneously run at the same time: one on the odd lines, one on the even lines. Using this approach allows for bit planes to be grouped much closer together in time, albeit separated spatially, relative to traditional SLM PWM sequences.

A spatial light modulator controller such as the DLP™ LightCommander™ FPGA may be used to support line-interlaced loading of different bit planes within a reset group.

BRIEF DESCRIPTION OF THE DRAWINGS

FIG. 4 illustrates an example of a data loading sequence in accordance with the invention.

FIG. 5 further illustrates the loading of the less significant bits of the sequence of FIG. 4.

FIG. 6 illustrates another example of a data loading sequence in accordance with the invention.

DETAILED DESCRIPTION OF EXAMPLE EMBODIMENTS

Figure 1:
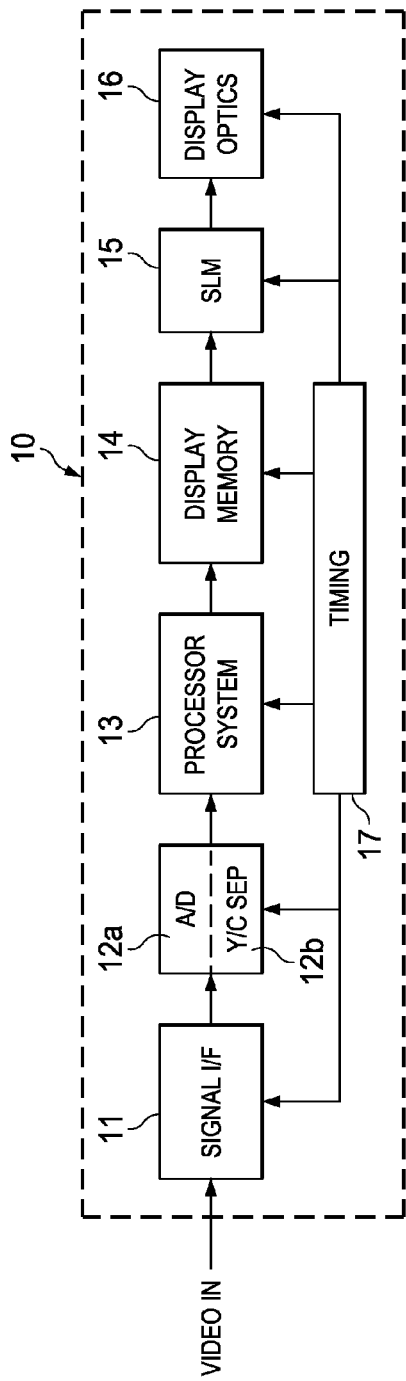
FIGS. 1 and 2 are block diagrams of image display systems, each having an SLM that is addressed with a split-reset PWM data loading method in accordance with the invention.
Figure 2:
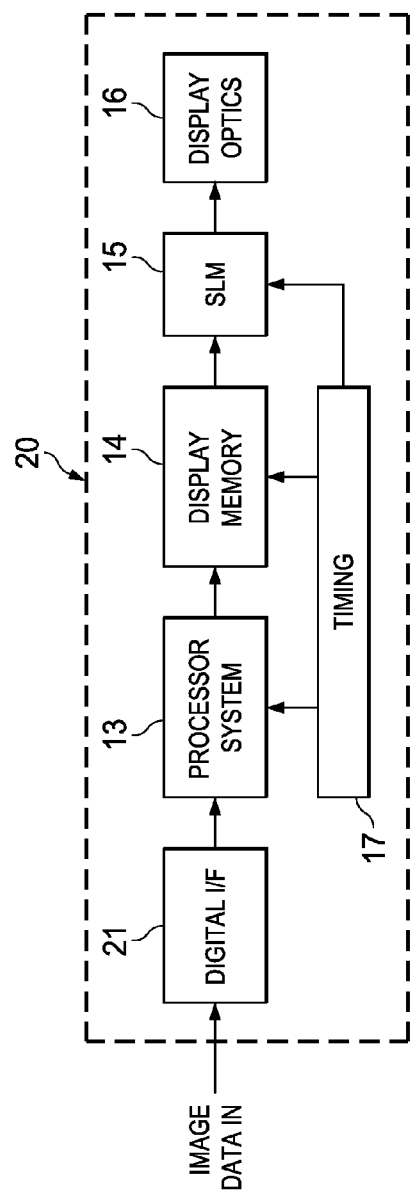

FIG. 1 is a block diagram of a projection display system 10, which uses an SLM 15 to generate real-time images from a analog video signal, such as a broadcast television signal. FIG. 2 is a block diagram of a similar system 20, in which the input signal already represents digital data. In both FIGS. 1 and 2, only those components significant to main-screen pixel data processing are shown. Other components, such as might be used for processing synchronization and audio signals or secondary screen features, such as closed captioning, are not shown.

Signal interface unit 11 receives an analog video signal and separates video, synchronization, and audio signals. It delivers the video signal to A/D converter 12*a* and Y/C separator 12*b*, which convert the data into pixel-data samples and which separate the luminance ("Y") data from the chrominance ("C") data, respectively. In FIG. 1, the signal is converted to digital data before Y/C separation, but in other embodiments, Y/C separation could be performed before A/D conversion, using analog filters.

Processor system 13 prepares the data for display, by performing various pixel data processing tasks. Processor system 13 includes whatever processing memory is useful for such tasks, such as field and line buffers. The tasks performed by processor system 13 may include linearization (to compensate for gamma correction), colorspace conversion, and line generation. The order in which these tasks are performed may vary.

Display memory 14 receives processed pixel data from processor system 13. It formats the data, on input or on output, into bit-plane format, and delivers the bit-planes to SLM 15 one at a time. The bit-plane format permits each pixel element of SLM 15 to be turned on or off in response to the value of 1 bit of data at a time. In a typical display system 10, display memory 14 is a double buffer memory, which means that it has a capacity for at least two display frames. The buffer for one display frame can be read out to SLM 15 while the buffer for another display frame is being written. The two buffers are controlled in a "ping-pong" manner so that data is continuously available to SLM 15.

As discussed above, the data from display memory is delivered in bit-planes to SLM 15. Although this description is in terms of a DMD-type of SLM 15, other types of SLMs could be substituted into display system 10 and used herein. For example, SLM 15 could be an LCD-type SLM. Essentially, DMD 15 uses the data from display memory 14 to address its pixel elements. The "on" or "off" state of each pixel element in the array of DMD 15 forms an image.

U.S. Pat. No. 5,278,652, entitled "DMD Architecture and Timing for Use in a Pulse-Width Modulated Display System", describes a method of formatting video data for use with a DMD-based display system and a method of addressing them for PWM displays, and is incorporated herein by reference. Some of the techniques discussed therein include clearing blocks of pixel elements, using extra "off" times to load data, and of breaking up the time in which the more significant bits are displayed into smaller segments. These techniques could be used for any SLM using PWM.

Display optics unit 16 has optical components for receiving the image from SLM 15 and for illuminating an image plane such as a display screen. For color displays, the bit-planes for each color could be sequenced and synchronized to a color wheel or other sequential color light source that is part of display optics unit 16. Or, the data for different colors could be concurrently displayed on respective ones of multiple SLMs and combined by display optics unit 16. Master timing unit 17 provides various system control functions.

1. Split Reset Addressing

Figure 3:
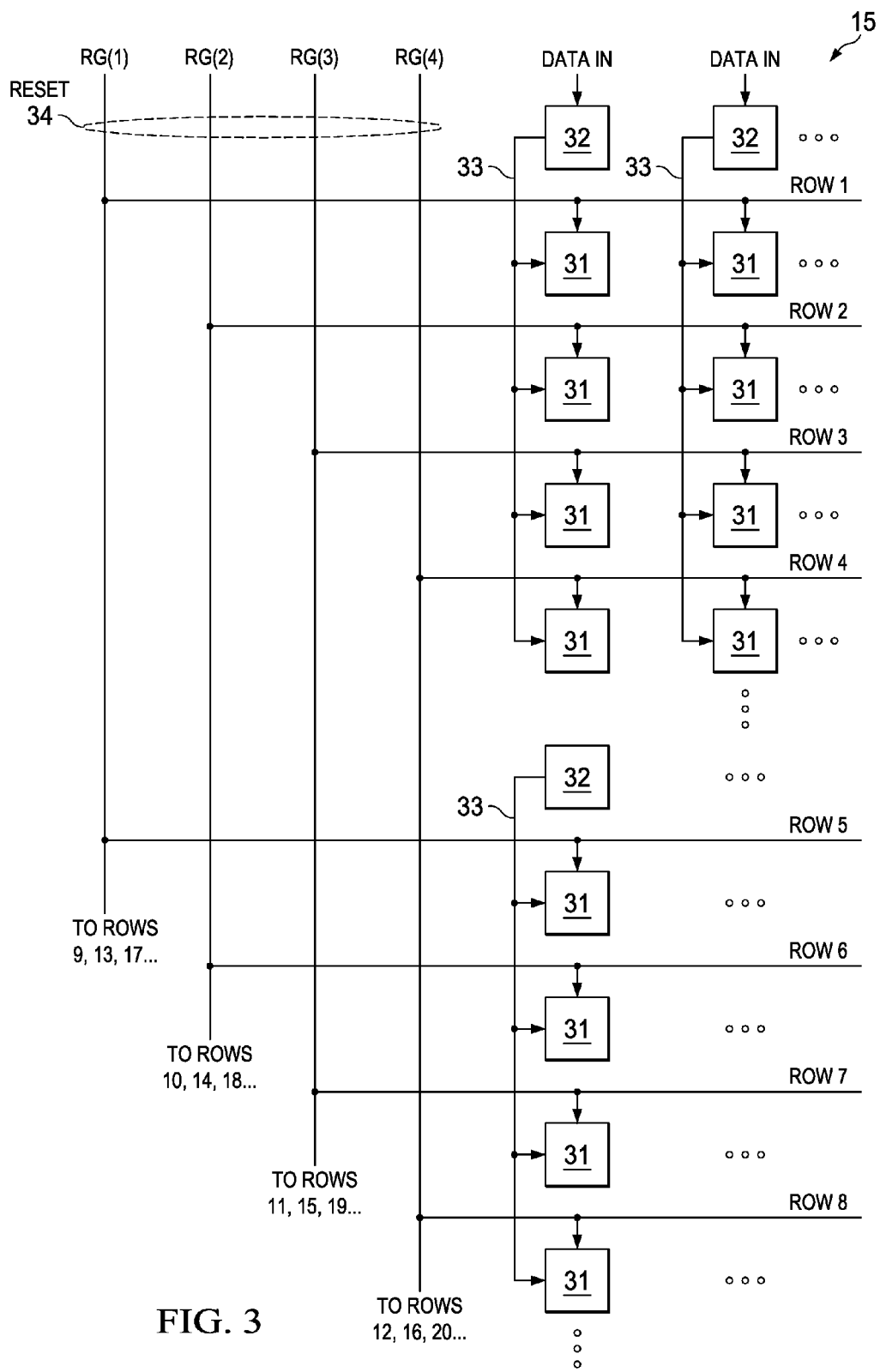
FIG. 3 illustrates the SLM of FIGS. 1 and 2, configured for split-reset addressing.

FIG. 3 illustrates the pixel element array of SLM 15, configured for split-reset addressing. For simplicity of description, only a small number of pixel elements 31 and their related memory cells 32 are shown, but as indicated, SLM 15 has additional rows and columns of pixel elements 31 and memory cells 32. A typical SLM 15 has many hundreds or thousands of such pixel elements 31.

In the example of FIG. 3, sets of four pixel elements 31 share a memory cell 32. As explained below, this divides SLM 15 into four reset groups of pixel elements 31. The data for these reset groups is formatted into reset group data. Thus, where p is the number of pixels and q is the number of reset groups, a bit-plane having p number of bits is formatted into a reset group having p/q bits of data. The illustrated reset groups are shown divided into groups of sets of evenly spaced horizontal lines or rows; however, the disclosed method is also applicable to groupings of horizontally or vertically adjacent lines or columns, and to other groupings of non-adjacent rows, columns, mixed rows and columns or other subsets of adjacent or non-adjacent pixels. In the shown evenly spaced row reset grouping example, every fourth horizontal line or row of pixel elements 31 belongs to a different reset group. In another, common grouping, reset groups are established by pixels of equal given numbers of adjacent rows.

FIG. 3 illustrates how a single memory cell 32 serves multiple pixel elements 31 in one reset group. Pixel elements 31, which in the described example comprises DMD pixel elements, are operated in a bi-stable mode. The switching of their states from ON to OFF is controlled by loading their respective memory locations in memory cells 32 with a corresponding bit of data (1 or 0) and applying a voltage indicated by that bit to address electrodes connected to the pixel elements via address lines 33. Then, the state of the pixel element 31 is switched, in accordance with the voltage applied to each, by means of a reset signal via reset lines 34. In other words, for each set of four pixel elements 31, either 1 or a 0 respective data value is delivered to the respective corresponding address location in memory cell 32, and applied to these pixel elements 31 as a "+" or "−" voltage. Signals on the reset lines 34 determine which pixel element 31 in that set will change state. For the illustrated embodiment, individual pixel elements 31 of rows 1 and 5 are reset to the bit-plane data stored for that pixel element in the associated memory cell 32 in response to a reset signal given on the line RG(1). In a configuration with pixels of equal numbers of, e.g., four adjacent rows defining each reset group, the data stored for the individual pixel elements of four adjacent rows (e.g., rows 1-4) will all be reset to the respective bit-plane data values stored in the associated memory cell 32.

One aspect of split-reset addressing, as described in U.S. Pat. No. 5,497,172, is that only a subset of the entire SLM array is loaded at one time. In other words, instead of loading an entire bit-plane of data at once, the loading for reset groups of that bit-plane's data occurs at different times within the frame period. A reset signal determines which pixel element 31 associated with a memory cell 32 will be turned ON or OFF.

Regardless of the reset grouping arrangement, it will be appreciated that the pixel elements 31 for all pixel elements in the reset grouping will be reset upon receipt of the enabling signal on the corresponding reset grouping line (RG(1)-RG(4)). Each pixel element 31 of each reset group is in communication with a corresponding memory location in memory cell 32, for loading according to the timing for receipt of the reset signal.

In the illustrated horizontal split reset example, pixel elements 31 from each of the first four lines, each belonging to a different reset group, share the same memory cell 32. The pixel elements 31 from each set of the next four lines would also share corresponding respective same memory cells 32. In each set of four pixel elements 31, four reset lines 34 control the times when the pixel elements 31 change state. Each pixel element 31 in this set is connected to a different reset line 34. This permits each pixel element 31 in a set to change its state at a different time from that of the other pixel elements 31 in that set. It also permits an entire reset group to be controlled by a common signal on its reset lines 34.

In the adjacent line grouping example, pixel elements from each set of four adjacent rows, each belonging to a same reset group, would all be reset to the bit value for the loaded bit-plane in the respective locations of the same or different memory cell 32 (depending on configuration). In this case, for each different set of four rows of pixel elements 31, a different single reset line 34 would control the times when the pixel elements 31 of the four adjacent rows change state. Each pixel element 31 in each set of four rows is connected to a same reset line 34. This permits all pixel elements 31 in a set of four adjacent rows to change its state at a different time from that of all pixel elements 31 in another set of four adjacent rows. It, too, permits an entire reset group to be controlled by a common signal on its respective reset line 34.

Once all memory cells 32 for the pixel elements 31 of a particular reset group have been loaded, the reset lines 34 provide a reset signal to cause the states of those pixel elements 31 to change in accordance with the data in their associated memory cells 32. In other words, the pixel elements 31 retain their current state as the data supplied to them changes, and until receiving a reset signal.

PWM addressing sequences for split-reset SLM's are devised in accordance with various heuristic rules. One rule is that the data for no more than one reset group can be loaded at the same time. In other words, the loading of different reset groups must not conflict.

When split-reset loading is used for PWM, certain loading sequences cause visual artifacts, which can be avoided by modifications to the loading sequence. Moreover, certain artifacts are related to the type of image being displayed.

A first type of artifact occurring in images is seen as a contouring of particular levels in the image as a function of rapid eye motion, motion of the SLM, or interruptions such as caused by hand waving in front of the face. This artifact is avoided by dividing the display times of the bit-planes of the more significant bits into smaller segments. For example, for a frame period having 255 time slices and 8-bit pixel values, the MSB, bit 7, is represented by an ON or OFF time of 128 time slices. The MSB bit-plane data for each reset group is loaded at different times but displayed for this 128 time-slice duration. These 128 time slices can be divided into segments. Typically, the segments are of equal duration, but this is not necessary. The loading for the segments is distributed throughout the frame period. This loading method is referred to as an interleaving method. The bit-planes selected for segmentation could be any one or more of the bit-planes other than that of the LSB.

A second type of artifact occurs during motion images, where the viewer tracks the object undergoing motion. This artifact is avoided by localizing as much illumination as possible into an instantaneous burst. Subject to the rule that no two reset groups can be loaded at once, data for the same bit-weights of all reset groups are loaded near together in time. This addressing method is referred to as an alignment method.

FIGS. 4-6 illustrate how aspects of both interleaving and aligning can be combined to result in a data loading sequence that minimizes visual artifacts for both still and motion images. In each of the methods, 8-bit pixel values are assumed, so as to provide 256 levels of brightness resolution. Also, for purposes of simplicity, only four reset groups are assumed. However, the same concepts are applicable to pixel values with a different resolution, as well as to SLMs having fewer or more reset groups.

FIGS. 4 and 5 illustrate an example of a method of loading data formatted for PWM on a split-reset SLM. This method combines features of both interleaving and aligning. Bit-plane segments (for bits 5-7) or unsegmented bit-planes (for bits 0-4) are loaded in the basic sequence illustrated in FIG. 4. Each reset group is loaded in this same sequence, with the exception being the unsegmented bit-planes (bits 0-4), whose loading sequence is illustrated in FIG. 5. FIGS. 4 and 5 are intended to illustrate loading sequences as opposed to display timing—an example of both loading sequence and display timing is illustrated in Appendix A of U.S. Pat. No. 5,497,172.

Consistent with the interleaving method, the more significant bits (bits 5-7) are split into segments, which are distributed throughout the frame period. However, consistent with the alignment method, the distribution of the more significant bit segments is time-ordered rather than random. The time-ordering calls for loading the more significant bits in a regular sequence such that segments of the same bit weight are displayed at nearly the same time for all reset groups. The bit-planes for the less significant bits are loaded during the middle of the frame period.

More specifically, the more significant bits, bits 7-5, are broken into segments. Bit 7 has 14 segments, bit 6 has 8, and bit 5 has 4. Each segment is 16 time slices long, except for two segments of bit 7, one immediately before and one immediately after the less significant bits. As explained below, these two segments may be used as buffer segments when there is a large number of reset groups. If the number of reset groups is small, the buffer segments may not be required and all segments of a bit-plane could be a constant size. The less significant bits, bits 4-0, are not broken into segments. Bit 4 has 16 LSB periods, bit 3 has 8, bit 2 has 4, bit 1 has 2, and bit 0 has 1.

The loading of each frame of data has three phases—front-frame loading, mid-frame loading, and end-frame loading. During front-frame loading, the segments for bits 5-7 are loaded in a regular sequence. This means that each reset group is loaded in the same sequence. During mid-frame loading, bits 0-4 are loaded. The loading sequence of bits 0-4 varies among the reset groups so as to avoid conflicts. During end-frame loading, all segments of bits 5-7 remaining in the frame are loaded in a regular pattern.

During loading, for each next reset group, the loading of corresponding segments or unsegmented bit-planes is staggered by at least one time slice. Although the result is a slight skew from each reset-group to the next, the staggering satisfies the rule that no two reset groups are loaded at the same time. Typically, it is desirable to minimize the skew to only one time slice, but as explained below, avoiding conflicts when loading less significant bits may require a greater skew.

FIG. 5 illustrates an example of the mid-frame loading of the less significant bits, which varies among reset groups. In the example of FIG. 5, there are four reset groups, designated as RG(1), RG(2), RG(3) and RG(4). In general, the smaller the number of reset groups, the simpler it is to avoid loading conflicts.

FIGS. 4 and 5 also illustrate the relationship between the number of loads per frame and the number of time slices per frame. The number of loads per frame cannot exceed the number of time slices of a frame. The number of loads per frame is the number of segments and unsegmented bit-planes, times the number of reset groups. In the example of FIGS. 4 and 5, for each reset group, there are 14+8+4(26) segments of bits 7-5 and 5 bit-planes for bits 4-0. Thus, there are 26+5=31 loads per frame per reset group. With 4 reset groups, the number of loads per frame is 31*4=128. This is an acceptable segmentation scheme because 128 is less than 255, the number of time slices.

Appendix A of U.S. Pat. No. 5,497,172, incorporated herein by reference, illustrates how the loading sequence of FIGS. 4 and 5 may be adapted for SLMs having a larger number of reset groups. As the number of reset groups increases, the number of time slices required to load data per frame increases. For example, an SLM having 16 reset groups and following the segmentation scheme of FIGS. 4 and 5, requires 31*16=496 loads per frame. This may be accomplished by dividing the frame into 510 time slices instead of 255. Each segment of bits 7-5 and each bit-plane for bits 4-0 is displayed for twice as many time slices. For example, the LSB bit-plane is displayed for two time slices rather than one.

Also, as illustrated by Appendix A, as the number of reset groups increases, the number of loads for the less significant bits may increase past the time slices that they are allocated. For example, an SLM that has 16 reset groups and follows the sequence of FIG. 4, requires 5*16=80 loads to load bits 4-0. However, where there are 510 time slices per frame, the mid-frame loading of bits 4-0 is allocated a total of only 62 time slices. To accommodate the increased number of mid-frame loads, the staggering of the reset group load times is increased. During mid-frame loading, the loading for the first bit-plane is delayed by 3 time slices from one reset group to the next. As a result, the size of the buffer segment immediately preceding this bit-plane grows by 3 time slices from one reset group to the next. To re-align the reset groups after mid-frame loading, the buffer segment immediately following the last mid-frame bit-plane shrinks by 3 time slices for each next reset group.

FIG. 6 illustrates another method of split-reset PWM addressing. Like FIGS. 4 and 5, FIG. 6 illustrates a sequence that combines features of both interleaving and aligning. However, in the method of FIG. 6, bits 3 and 4 as well as bits 7-5, are segmented. Thus, bits 3-7 are treated as the more significant bits.

The segments of bits 3-7 are loaded in a regular sequence such that segments of the same bit weight are loaded at nearly the same time for all reset groups. The bit-planes for bits 2-0 are loaded at the middle of the frame period. The rule that no two reset groups can be loaded at once is satisfied by staggering the loading at least one time slice.

As in the method of FIGS. 4 and 5, the segments immediately before and after the mid-frame loading of the less significant bits may be used as buffer segments when the number of reset groups is too large to avoid conflicts without them. However, for the same reason, the segments immediately before and after the bit 3 segments may also be used as buffer segments. As explained above, this means that the size of these segments may grow and shrink from reset group to reset group, which permits loading of the less significant bits to be staggered an extra amount.

The method of FIGS. 4 and 5 and the method of FIG. 6 have several common features. Bit-planes of the more significant bits are segmented. To the extent possible, bit segments are temporally aligned. However, as the bit-weight of the segment decreases and the number of reset groups increases, it becomes more difficult to align the data and still avoid loading conflicts. Thus, the bit-planes of less significant bits are concentrated in mid-frame and are scrambled rather than temporally aligned. Also, buffer segments are used to permit increased staggering so that the number of reset groups does not prohibit some degree of alignment of the mid-frame bits or segments of bit-planes of less significant bits.

The order in which reset groups are addressed has an effect on whether artifacts occur. For example, in the example horizontal split reset configuration, where n reset groups are arranged as every nth line of a display, certain reset group patterns can reduce the perception of strobing. In particular, a "by 3" pattern is desirable.

For an SLM having 16 horizontal reset groups, such that every 16th line is in the same reset group, an example of a "by 3" ordering pattern is given in U.S. Pat. No. 5,497,172.

In other words, all rows of the 1st reset group are loaded, then all rows of the 4th reset group, in a series of every third reset group. Then, beginning with the 0th reset group, every third reset group is loaded. Finally, a third series of every third reset group, beginning with the 2d reset group, is loaded. In general, the reset groups are loaded in n series of every nth reset group, and the sequence can be begin with any reset group.

The establishing of bit-planes for the MSBs and LSBs in order to avoid artifacts involves considerable complexity and processing.

The disclosed method provides a modification of the traditional approach which offers many advantages. Whereas the traditional approach loads all bits of a single bit-plane into the respective memory locations for all the image pixel elements in a time slice, the modified approach avoids artifacts by loading bits of different bit-planes into the respective memory locations for different pixel elements in a time slice.

Figure 7:
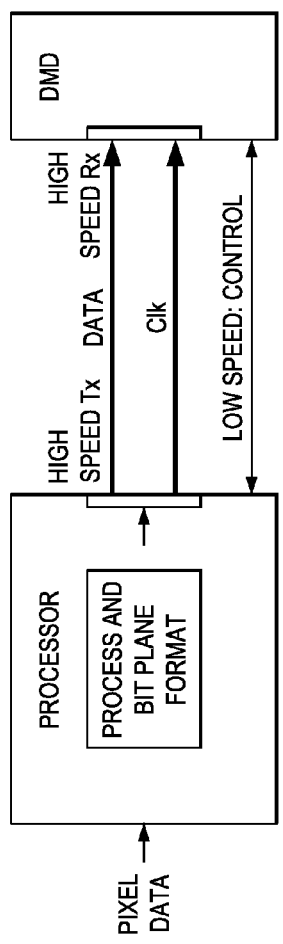
FIGS. 7-12 are drawings helpful in understanding an embodiment according to principles of the invention.

In an example embodiment, memory locations for loading pixel elements of alternating rows are loaded with bits of different bit planes for a given time slice. For example, bit values for bit plane data traditionally loaded for a first time slice bit-plane are loaded into memory locations for odd row pixels and bit values for bit plane data traditionally loaded for a second time slice bit-plane are loaded into memory locations for even row pixels, for each of the reset groups as illustrated in the drawings and indicated in the attachments hereto. Such temporal interleaving, especially when used in conjunction with the spatial interleaving provided by the different reset groups, has the advantage that undesirable artifacts can be avoided in less complex ways, with lower bandwidth and power requirements.

his bandwidth and power reduction offered by such line-interlaced loading offers excellent opportunities for providing good image quality for utilization, for example, in the implementation of display systems for incorporation with hand-held devices such as cell phones, PDAs, laptop computers and the like. FIG. 7 illustrates a DMD SLM device used for display of images using bit plane data developed by a cell phone processor, wherein 1-4 channels are provided for transferring data between the processor and the display device. For high resolution imaging or low data clock speeds, such data transfer is subject to severe bandwidth restrictions. The temporal interleaving of data of different bit-planes in a same reset group enables reduced bit splitting relative to conventional PWM bit arrangements, leading to reduced power consumption between the processor that the SLM device. A good image quality may be maintained while reducing bandwidth requirements by a factor of two and without increasing the displayed bits. PWM artifacts are reduces, mid-intensity rainbow artifacts are reduced, and slow frame flicker is reduced. The intensity-to-bit plane image data transformation function may be implemented at lower cost.

Figure 8:
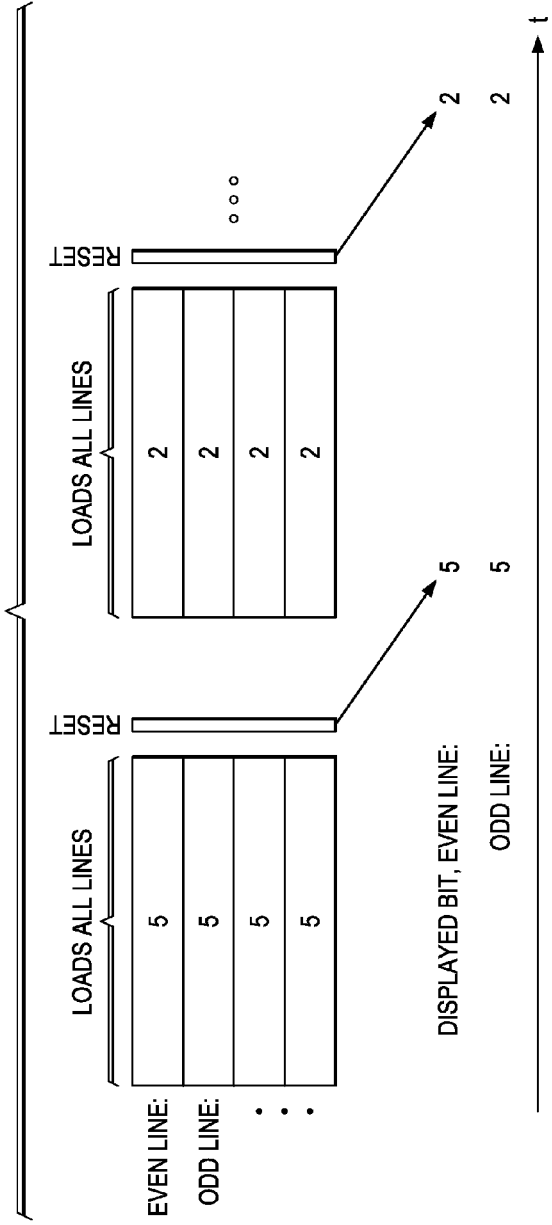

FIG. 8 illustrates a conventional bit-plane loading scheme wherein, during any period between resets, all rows of a same reset group are loaded with bit values for a same bit plane. For example, in a given PWM sequence timeline, all 1's and 0's for a 5th significant bit level bit-plane are loaded into all pixels of a given reset grouping (both odd and even lines), followed by all 1's and 0's for a 2nd significant bit level bit-plane.

Figure 9:
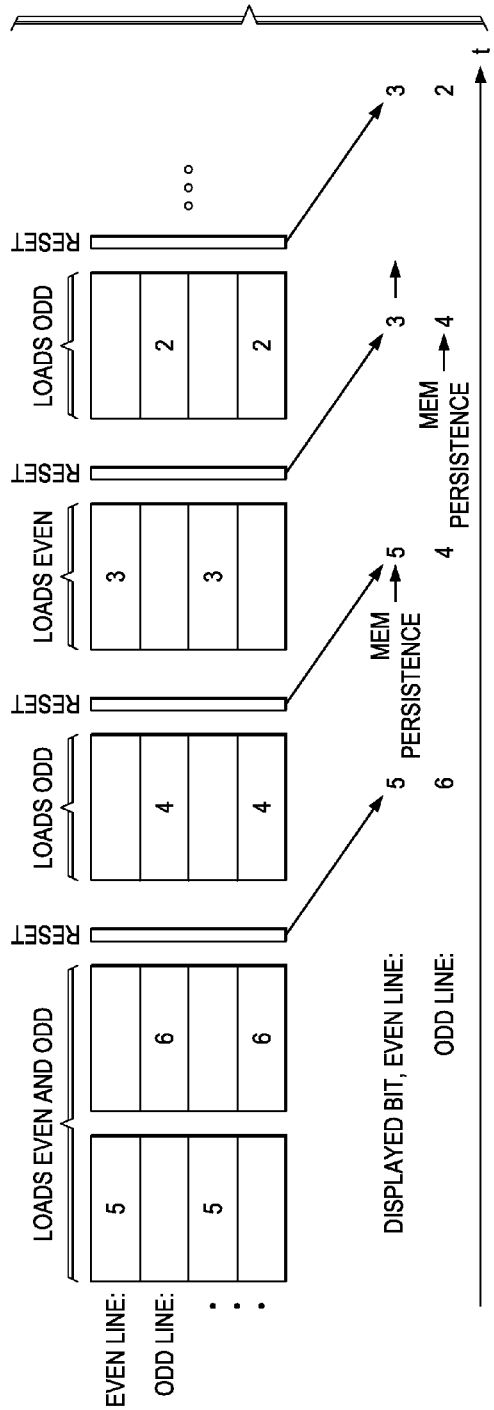

In contrast, FIG. 9 illustrates the modified approach wherein, during a first reset period bit values of a 5th significant bit level bit-plane are loaded into even row pixels and bit values of a 6th significant bit level bit-plane are loaded into odd row pixels of the same reset grouping. Then, during a second reset period, bit values of a 4th significant bit level bit-plane are loaded into the odd lines, with the 5th significant bit level bit-plane values remaining in memory locations for the even lines. Next, during a third reset period, bit values for a 3rd level bit plane are loaded into the even lines, with the 4th level bit plane values remaining in memory for persistence on the odd lines. Then, the 2nd level bit plane data is loaded into the odd lines at the next reset, with the 4th level data persisting in the even lines. And, so forth. Such interleaving of the data values of different bit planes enables the loading of lesser significance bit values more frequently, while bit values of more significance persist in memory locations of alternating line pixels, reducing the overall bandwidth for data transfer and enabling simpler bit value positioning arrangements (e.g., in look-up tables) to achieve the same (or better) artifact avoidance.

Figure 10:
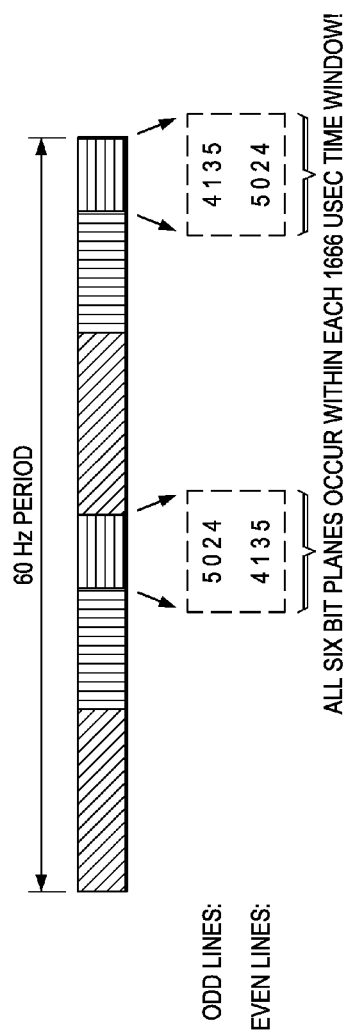
Figure 11:
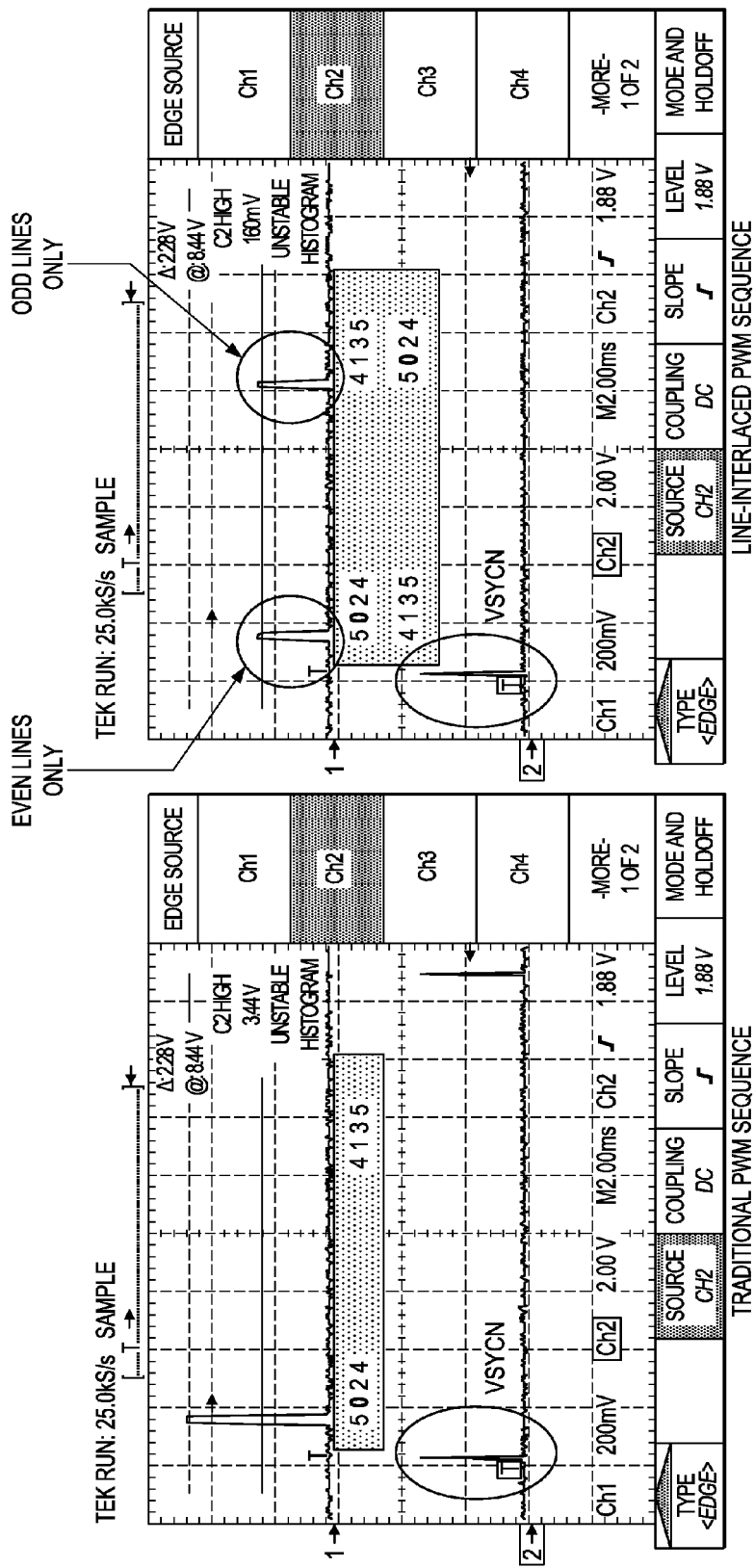
Figure 12:
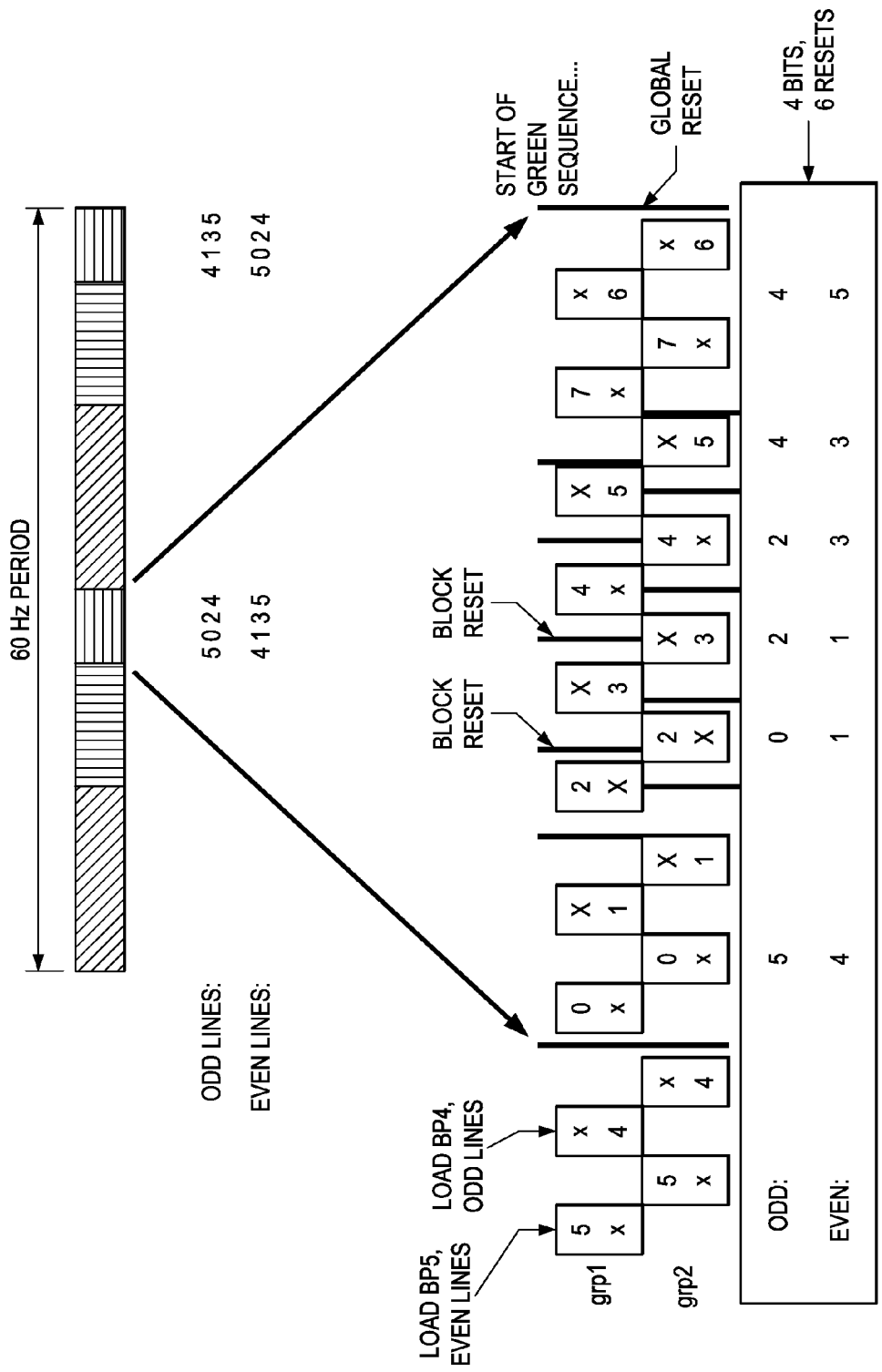

FIG. 10 illustrates another example, wherein six bit-plane bit values are loaded within each 1666 usec. time window. FIG. 11 illustrates a histogram representation for loading all 1's for bit-planes using the traditional (left side view) and the line-interleaved (right side view) loading schemes. As shown in the left side view, where the 1's for the first bit plane sequence (bit #0) are loaded in all lines of a same reset grouping, there is a 100% intensity amplitude provided once during the frame. However, as shown in the right side view, where the bit #0 values are interlaced in an odd/even row loading approach, the bit#0 approach provides the #0 values at 50% amplitude with two occurrences per frame. Additional details are shown in FIG. 12 and in the attachments.

Those skilled in the art to which the subject matter hereof relates will appreciate that modifications may be made to the described embodiments, and also that many other embodiments are possible, within the scope of the claimed invention.

What is claimed is:

1. A method of controlling a micromirror array, the array comprised of an array of individually controllable micromirror elements arranged in a plurality of reset groups, each of the micromirror elements in a given reset group having a one-to-one correspondence with a respective memory cell of an array of memory cells, the method comprising the steps of:
loading a first portion of a first bit plane of image data into a first subset of memory cells corresponding to a first subset of micromirror elements of the given reset group;
loading a first portion of a second bit plane of image data into a second subset of memory cells corresponding to a second subset of micromirror elements of the given reset group;
resetting the micromirror elements of the given reset group in a first reset operation, to set positions of the first subset of micromirror elements based on the first portion of the first bit plane loaded into the first subset of memory cells, and to set positions of the second subset of micromirror elements based on the first portion of the second bit plane loaded into the second subset of memory cells;
loading a second portion of the second bit plane of image data into the first subset of memory cells;
loading a second portion of the first bit plane of image data into the second subset of memory cells; and
resetting the micromirror elements of the given reset group in a second reset operation, to set positions of the first subset of micromirror elements based on the second portion of the second bit plane loaded into the first subset of memory cells, and to set positions of the second subset of micromirror elements based on the second portion of the first bit plane loaded into the second subset of memory cells.

2. The method of claim 1, the array of micromirror elements in each reset group being arranged in rows and columns of micromirror elements; the first subset of micromirror elements comprising micromirrors of a subset of rows or columns of the given reset group; and the second subset of micromirror elements comprising micromirrors of a subset of different rows or columns of the given reset group.

3. The method of claim 2, wherein the rows or columns of the subset of different rows or columns comprise rows or columns interleaved with the rows or columns of the subset of rows or columns.

4. The method of claim 3, wherein the rows or columns of the subset of rows or columns comprise rows; and wherein the rows or columns of the subset of different rows or columns comprise rows alternating with the rows of the subset of rows or columns.

5. A method of controlling a micromirror array, the array comprised of an array of individually controllable micromirror elements arranged in a plurality of reset groups, each of the micromirror elements in a given reset group having a one-to-one correspondence with a respective memory cell of an array of memory cells, the method comprising the steps of:
loading a first portion of a first bit plane of image data into a first subset of memory cells corresponding to a first subset of micromirror elements of the given reset group;
loading a first portion of a second bit plane of image data into a second subset of memory cells corresponding to a second subset of micromirror elements of the given reset group;
resetting the micromirror elements of the given reset group in a first reset operation, to set positions of the first subset of micromirror elements based on the first portion of the first bit plane loaded into the first subset of memory cells, and to set positions of the second subset of micromirror elements based on the first portion of the second bit plane loaded into the second subset of memory cells;
with the first portion of the first bit plane of image data remaining in the first subset of memory cells, loading a first portion of a third bit plane of image data into the second subset of memory cells;
resetting the micromirror elements of the given reset group in a second reset operation, to retain positions of the first subset of micromirror elements based on the first portion of the first bit plane loaded into the first subset of memory cells, and to set positions of the second subset of micromirror elements based on the first portion of the third bit plane loaded into the second subset of memory cells;
with the first portion of the third bit plane of image data remaining in the second subset of memory cells, loading a first portion of a fourth bit plane of image data into the first subset of memory cells; and
resetting the micromirror elements of the given reset group in a second reset operation, to set positions of the first subset of micromirror elements based on the first portion of the fourth bit plane loaded into the first subset of memory cells, and to retain positions of the second subset of micromirror elements based on the first portion of the third bit plane loaded into the second subset of memory cells.

* * * * *